United States Patent [19]

Chen

[11] Patent Number: 5,035,727
[45] Date of Patent: Jul. 30, 1991

[54] OXYGEN EXTRACTION FROM EXTERNALLY FIRED GAS TURBINES

[75] Inventor: Michael S. Chen, Zionsville, Pa.

[73] Assignee: Air Products and Chemicals, Inc., Allentown, Pa.

[21] Appl. No.: 534,987

[22] Filed: May 24, 1990

[51] Int. Cl.$^5$ ................... B01D 53/22; B01D 71/02
[52] U.S. Cl. ............................. 55/16; 55/68
[58] Field of Search .................. 55/16, 68, 158; 204/129

[56] References Cited

U.S. PATENT DOCUMENTS

| | | | |
|---|---|---|---|
| 2,540,151 | 2/1951 | Wells et al. | 183/115 |
| 3,400,054 | 9/1968 | Ruka et al. | 204/1 |
| 3,713,271 | 1/1973 | Franz et al. | 55/16 |
| 3,930,814 | 1/1976 | Gessner | 55/16 |
| 4,131,514 | 12/1978 | Chong et al. | 204/129 |
| 4,132,766 | 1/1979 | Erickson | 423/579 |
| 4,174,955 | 11/1979 | Blackmer et al. | 55/158 |
| 4,198,213 | 4/1980 | Mannatt | 55/16 |
| 4,224,045 | 9/1980 | Olszewski et al. | 62/30 |
| 4,330,633 | 5/1982 | Yoshisato et al. | 501/152 |
| 4,340,578 | 7/1982 | Erickson | 423/579 |
| 4,382,366 | 5/1983 | Gessner | 62/31 |
| 4,545,787 | 11/1985 | Hegarty | 55/16 |
| 4,547,277 | 10/1985 | Lawless | 204/252 |
| 4,560,394 | 12/1985 | McDonald et al. | 55/16 |
| 4,597,777 | 7/1986 | Graham | 55/158 X |
| 4,659,448 | 4/1987 | Gordon | 204/277 |
| 4,713,152 | 12/1987 | Walsh | 204/130 |
| 4,725,346 | 2/1988 | Joshi | 204/242 |
| 4,761,957 | 8/1988 | Eberhardt et al. | 60/650 |
| 4,950,371 | 8/1990 | McElroy | 55/16 X |

FOREIGN PATENT DOCUMENTS

WO8702593 5/1987 European Pat. Off. .

OTHER PUBLICATIONS

LaHaye et al.; "Externally Fired Gas Turbine/Combined Cycle"; *Coal Technology;* 1986.
Yuan and Kroger; Stabilized Zirconia as an Oxygen Pump; *J. Electrochem. Soc.;* pp. 594–600; May 1969.
Takahashi and Iwahara; Oxide Ion Conductors Based on Bismuthsesquioxide; *Mat. Res. Bull.;* vol. 13; pp. 1447–1453; 1978.
Gur and Huggins; Decomposition of Nitric Oxide Using Solid State Electrolyte; *Fast Ion Transport in Solids;* pp. 109–112; 1979.

*Primary Examiner*—Robert Spitzer
*Attorney, Agent, or Firm*—Geoffrey L. Chase; James C. Simmons; William F. Marsh

[57] ABSTRACT

A process is provided for recovering oxygen from an externally fired power generating gas turbine system in which a hot, compressed air stream from a compressor to be expanded through a turbine expander to generate power is first passed over the feed side of a solid electrolyte membrane selective to the permeation of oxygen over other components of the air while a positive oxygen ionic potential is maintained on the membrane to separate oxygen from the stream, and removing the oxygen from the permeate side of the membrane before the residual air is expanded through the turbine expander to generate power.

10 Claims, 2 Drawing Sheets

OXYGEN EXTRACTION FROM EXTERNALLY FIRED GAS TURBINES

FIELD OF THE INVENTION

This invention relates to a method for recovering high purity oxygen
from externally fired power generating gas turbine systems using a high temperature solid electrolyte membrane.

BACKGROUND OF THE INVENTION

The separation of air into constituent components such as oxygen and nitrogen has been practiced for many years utilizing energy intensive processes such as cryogenic distillation, adsorptive separation, chemical absorption, and differential permeation through membrane media. These processes generally suffer from high utility costs or the lack of continuous or convenient regeneration or operation.

Various processes for separating air have been suggested in which at least some power is recovered from an effluent stream to provide a portion of the power requirements of the process itself.

For example, U.S. Pat. No. 4,132,766 describes a chemical air separation process wherein air, at elevated temperature and pressure, is separated into oxygen and nitrogen-rich waste streams by preferential chemical binding of oxygen from the air. The nitrogen-rich stream is then reduced in pressure through an expander before being vented. The expander drives the compressor to recover some power for the process. No net power is achieved by the process.

To provide additional power for the operation of compression equipment in a gas separation process, U.S. Pat. No. 4,340,578 suggests that in a chemical air separation plant, the waste nitrogen stream, still containing residual oxygen, is combusted with a fuel. The hot effluent is then expanded in several stages through turbines and power is recovered.

Alternately, U.S. Pat. No. 4,560,394 discloses that air may be compressed in a compressor, reduce in temperature by heat exchange against process streams or external cooling means and then separated into oxygen and a nitrogen-rich effluent stream by passage over a semipermeable membrane. While some power is recovered by pressure reduction of the nitrogen-rich stream, no fuel is combusted and no net power is produced.

Power generation can be achieved using a cryogenic air separation process as described in U.S. Pat. No. 4,224,045. In that process, air is compressed and then cooled to its liquefaction temperature before being distilled through a fractionation column. The waste stream from the column is rewarmed, recompressed, and then combusted with fuel and by-pass air. The combusted effluent is expanded through a turbine to recover power for the process.

U.S. Pat. No. 4,545,787 teaches a method for the generation of net power and the recovery of by-product oxygen-rich gas at low power requirements. Air is compressed to an elevated temperature and pressure. At least a portion of the air is combusted and a portion of the oxygen is removed from the air or combustion effluent through a membrane or adsorbent before the oxygen-lean combustion effluent is expanded through a turbine to recover power for the process and net power.

In the '045 and '787 patents discussed above, the type of fuel used is generally limited to "clean fuels" such a natural gas, oils, or synthesis gas in order to prevent the gas turbine blades and associated equipment from corroding and eroding. This rules out the use of cheaper, more abundant fuels such as coal, coal slurry, lignite, petroleum coke, biomass and solid waste. In an effort to overcome this disadvantage in the use of gas turbine systems for power generation, an externally fired gas turbine/combine cycle (EFGT) has been proposed as discussed, for example, by LaHaye et al. in Externally Fired Gas Turbine/Combine Cycle, *Coal Technology*, 1986 and Eberhardt et al. in U.S. Pat. No. 4,761,957.

In the EFGT power generation process, air is compressed and heated by a ceramic heat exchanger using an external hot combustion gas source. The clean hot air is then expanded through the turbine to recover power. The exhaust air is then fed to a suitable atmospheric combustor. The hot combusted effluent gas is used to heat the compressed air passing through the heat exchanger. The hot gas leaving the heat exchanger can further feed a steam generation (hence, combined cycle) system. Because the gas turbine blades see only clear hot air instead of combustion gas, the service life of the turbine is extended appreciably. However, the EFGT/combine cycle produces no oxygen.

SUMMARY OF THE INVENTION

The present invention provides a process for recovering high purity oxygen from an externally fired power generating gas turbine cycle at low capital cost and low energy requirements which comprises passing externally heated compressed air over the feed side of a solid electrolyte membrane unit and separating high purity oxygen from the air and recovering the oxygen at the permeate side of the membrane unit before expanding the oxygen-lean air through the gas turbine.

The process of the invention is an improvement over prior processes which normally generate power through an externally fired gas turbine or generate power and by-product oxygen through combustion of fuel and compressed air with expansion of the combusted gas through a turbine. The invention comprises passing externally heated compressed air over the feed side of a solid electrolyte membrane selective to the permeation of oxygen over other gaseous components, maintaining a positive oxygen ionic potential on the membrane to separate a portion of the oxygen from nitrogen, argon, and any other components of the air, and removing the oxygen product stream from the permeate side of the membrane before expanding the air stream through the turbine to generate power. The air stream is then fed to a low pressure combustion system. Hot combustion effluent can be used to further heat the hot, compressed process air, for example, in a heat exchanger. The effluent from the heat exchanger can then be fed to a steam generating unit for additional power recovery.

DETAILED DESCRIPTION OF THE INVENTION

Figure 1:
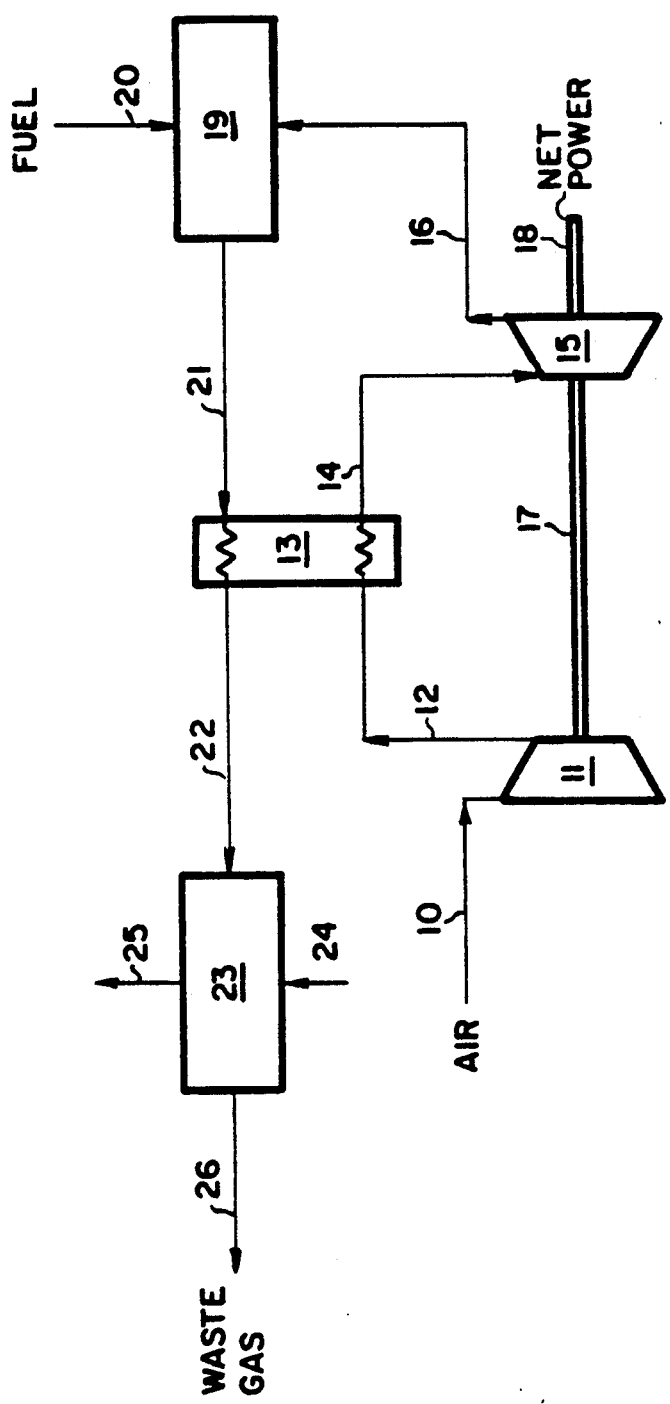
FIG. 1 is a schematic representation of a prior process for generating power using an externally fired gas turbine cycle.

In FIG. 1, which schematically illustrates a prior process for power generation using an externally fired gas turbine cycle, ambient air 10 is compressed by compressor 11. Exit air 12 at about 228 psig and 760° F. is heated in heat exchanger 13 to about 1962° F. Hot compressed air 14 is expanded through gas turbine 15 to generate power. A portion of the power generated is used to drive air compressor 11 by means of shaft 17. The remaining portion of the power generated is recovered as net power 18. Exhaust air 16 at about 958° F. and 15.4 psig is fed to combustor 19 for combustion of fuel 20. Combustor effluent 21 at about 2098° F. is then passed to heat exchanger 13 where compressed air 12 is heated as already described. Cooled combusted gas 22 at about 983° F. is sent to steam generator 23 to generate steam 25 from water 24. Waste gas 26 at about 364° F. is sent to a cleanup system (not shown) and vented. The only product of the prior process is net power.

Figure 2:
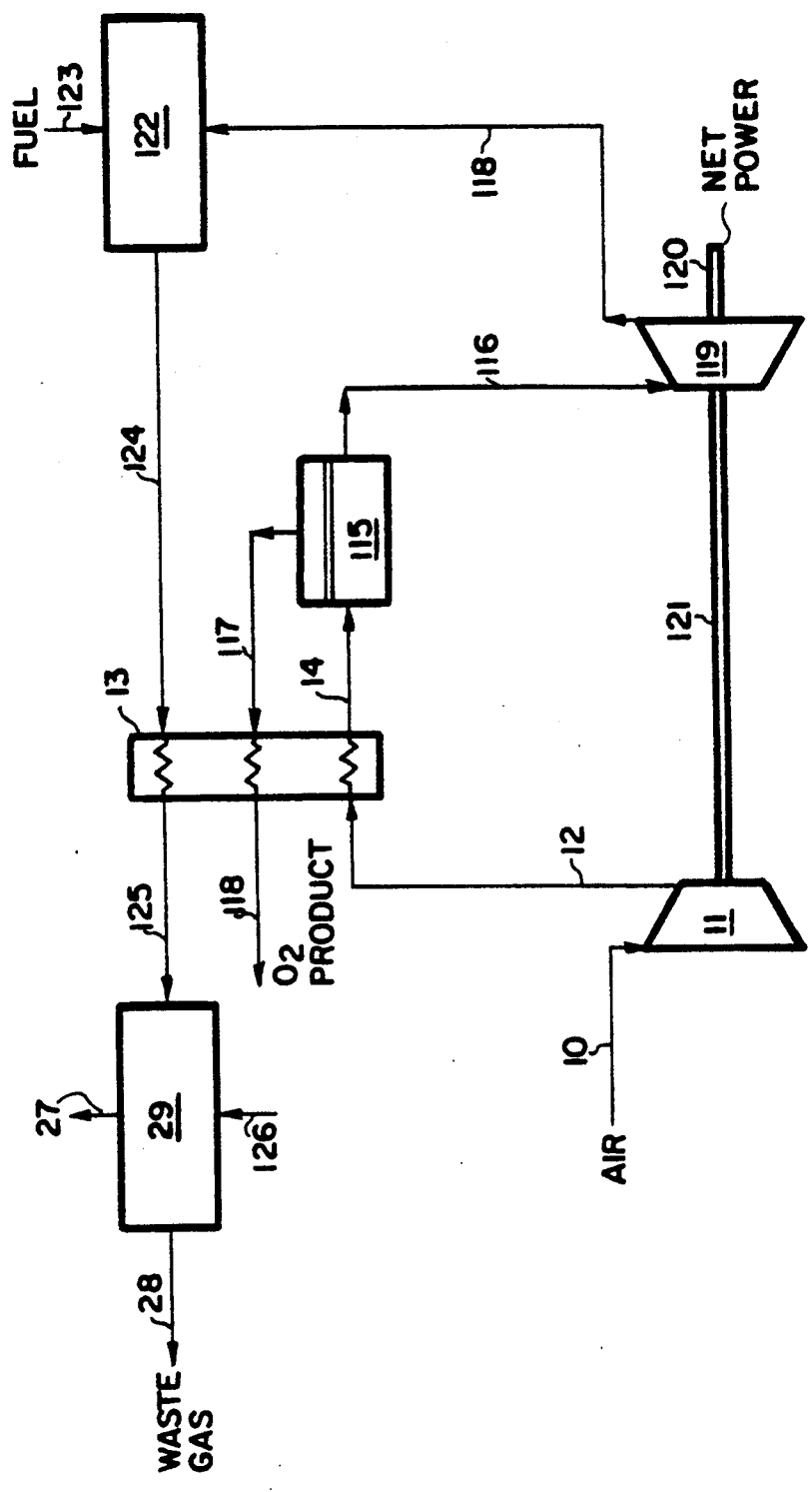
FIG. 2 is a schematic representation of a process of the invention.

By contrast, the present invention produces oxygen while generating power using an externally fired gas turbine system. An externally fired turbine is one in which the turbine does not see or experience combustion effluent gas, but rather only clean or uncombusted gas. Combustion effluent is used only to heat the turbine feed gas by indirect heat exchange. As shown in FIG. 2, ambient air 10 is compressed by compressor 11. Exit air 12 at about 228 psig and 762° F. is heated in heat exchanger 13 to about 1962° F. Hot compressed air 14 is then passed over the feed side of a solid electrolyte membrane system 15. A portion of the contained oxygen (about 23% of the feed oxygen) is extracted by permeating through to the permeate side of the membrane as high purity oxygen stream 17 which is cooled by passage through heat exchanger 13 to provide oxygen by-product stream 18. Oxygen-depleted air 16 is then expanded through gas turbine 19 to generate power. A portion of the power generated is used to drive air compressor 11 by means of shaft 21. The remaining portion of the power generated is recovered as net power 20. Exhaust air 18 at about 960° F. and 15.4 psig is fed to combustor 22 for combustion of fuel 23. Combustor effluent 24 at about 2102° F. is then passed to heat exchanger 13 where compressed air 12 is heated as already described. Cooled combustion gas 25 at about 980° F. is sent to steam generator 29 to generate steam 27 from water 26. Effluent 28 is sent to a cleanup system (not shown) and vented. Both power and pure oxygen are produced.

Some of the advantages of the invention over prior processes can be illustrated by reference to an example in which 1000 short tons per day of oxygen are extracted from compressed air during gas turbine power generation (the invention) versus EFGT for the generation of power only (prior process). Using the systems shown in FIGS. 1 and 2, feed air to the compressor is increased incrementally to keep the gas flow to the turbine the same in both cases for the same total power generation. This results in incrementally more air compression power and lower net power generation. The results are tabulated below. The difference in Net Power represents the power used for oxygen production.

|  | Prior process EFGT for power only | The invention EFGT for power and O2 |
| --- | --- | --- |
| Air, lb-mol/hr | 50,114 | 52,758 |
| Fuel as heat rate, BTU/KWH | 11,980 | 13,432 |
| Net Power, KW | 41,286 | 36,432 |
| Oxygen, Tons/Day | — | 1,000 |
| Steam, lb/hr | 210,000 | 210,000 |
| Net Power for O2 product, KWH/T | — | 107 |

The net power consumed in the production of by-product oxygen by the process of the invention is about 107 KWH/ton. This is considerably lower than the power required to produce a similar quantity of oxygen using a modern, state-of-the-art cryogenic air separation plant which typically requires something in the range of 250-300 KWH/ton. This surprising benefit is believed to result from the fact that only one mol of air needs to be compressed for each mol of oxygen extracted by the process of the invention whereas conventional, stand-alone air separation units require the compression of five mols of air to produce the same amount. In addition, the overall cost of producing oxygen by the process of the invention, including the cost of the solid electrolyte membrane and the heat exchanger area, is estimated to be lower by a significant margin.

The invention provides similar economic advantage over prior processes such as those discussed in U.S. Pat. No. 4,545,787, for example. In addition, the invention provides fuel flexibility inasmuch as the external combustor arrangement permits the use of abundantly available "dirty" and cheaper fuel such as coal. It also provides a higher driving force of oxygen partial pressure across the membrane which should require a smaller membrane area.

Any suitable equipment can be used to carry out the process of the invention including equipment which is commercially available. For example, any suitable high temperature heat exchanger can be employed including the ceramic heat exchanger CerHx from Hague International, South Portland, Maine.

The high temperature solid electrolyte membranes (SEM) useful in the invention are generally similar to those used for fuel cells and for the separation of oxygen from gases. The SEM can be a membrane of any desired configuration such as flat, tubular, honeycomb, and the like, situated between two electrodes positioned to apply external voltage across the membrane or film surface and multiple (two or more) cells can be connected in series or in parallel. Oxygen molecules on the feed side of the unit are electrochemically dissociated into oxygen ions on the cathode. The ions are then transported across the matrix of solid electrolyte film by the applied voltage and recombined to form oxygen molecules on the anode. Electrons are conducted through an external electric circuit and a direct power source.

The SEM units or cells can be constructed of any suitable solid electrolyte materials, or mixtures thereof, which are capable of transporting oxygen ions at high temperatures (e.g. 1000-2000° F. (535-1100° C.). By applying an external power input through electrodes and an electric circuit, the ionic nature of the membrane allows it to transport or "pump" oxygen from a region of low partial pressure to a region of higher pressure.

The selectivity of such membranes for oxygen is very high because the ionic transport mechanism would not be operative for other combustion gas components.

Examples of some such solid electrolyte materials which may be used include bismuth oxide, zirconia, and the like doped with various oxides such as yttria, calcia, barium oxides, and the like. Preferably bismuth oxide doped with calcia is used. Most preferably, bismuth sesquioxide-based materials are used because they have very high ionic conductivities.

Any suitable electrode materials having high electronic conductivity as well as high oxygen transport properties can be used such as, for example, silver, platinum, lanthanum-strontium-magnesium oxide (SLM), lanthanum-strontium-cobalt oxide (LSC), and the like. Preferably, LSM oxides are used for their high conductivities and thermal compatibility with the solid electrolyte materials.

The electrolyte membrane can have any suitable thickness, preferably in the range of from about 10 to 1000 micrometers, most preferably 20 to 100 microns, and can have any suitable oxygen conductivity such as, for example, conductivities in the range of about 0.01 to 2 $ohm^{-1} cm^{-1}$, preferably 0.5 to 1 $ohm^{-1} cm^{-1}$. The electrodes can have any suitable thickness and can be situated on either side of the electrolyte membrane. The electrodes are preferably porous and operated at any suitable current density, preferably ranging from about 0.05 to 2 amperes/$cm^2$, most preferably 0.5 to 1 ampere/$cm^2$.

Electrodeless SEM cells composed of a thin solid electrolyte film without electrodes can also be used. Suitable solid electrolyte materials can be any mixed conductors having high oxygen ionic and electronic conductivities such as Co—Sr—Bi, Co—La—Bi, Co—Sr—Ce, Co—La—Ce oxides, and the like, with oxygen ionic conductivities in the range of about 0.01 to 1 $ohm^{-1} cm^{-1}$ and electronic conductivities in the range of about 1 to 30 $ohm^{-1} cm^{-1}$, most preferably with ionic conductivities in the range of about 0.5 to 1 $ohm^{-1} cm^{-1}$ and electronic conductivities in the range of about 10 to 25 $ohm^{-1} cm^{-1}$. The electrodeless SEM cells are preferably operated by maintaining an oxygen pressure on the feed side such that a positive driving force for oxygen ion transport can be achieved in the absence of an externally applied voltage and power source. The electrons released at the anode would flow back to the cathode side through the mixed conductor film itself without going through electrodes and an external electrical circuit. One particular advantage of such a cell is a significant reduction in overpotential loss associated with electrode SEM cell systems. Alternatively, a sweep gas, such as an inert gas, can be passed over the permeate side of the membrane to lower the oxygen partial pressure to assist the permeation of oxygen.

Solid electrolytes as disclosed in U.S. Pat. Nos. 3,400,054; 4,131,514; 4,725,346, the disclosures of which are hereby incorporated herein by reference, and the like can also be employed.

Although the invention has been described in considerable detail in the foregoing, it is to be understood that such detail is solely for the purpose of illustration and that variations may be made by those skilled in the art without departing from the spirit and scope of the invention except as set forth in the claims.

What is claimed is:

1. A process for recovering oxygen from an externally fired power generating gas turbine system in which a hot, compressed air stream from a compressor is expanded through a turbine expander to generate power, which process comprises compressing air to make a hot, compressed air stream, further heating the air stream from the compressor with a hot combustion effluent from an external combustor, passing the hot, compressed air from the compressor over the feed side of a solid electrolyte membrane selective to the permeation of oxygen over other components of the air, maintaining a positive oxygen ionic potential on the membrane to separate oxygen from the air stream by situating the membrane between two electrodes positioned to apply external voltage across the membrane surface, removing oxygen from the permeate side of the membrane before expanding the residual air through the turbine expander to generate power and combusting the air expanded through the turbine expander with fuel in the external combustor and feeding the hot combustion effluent to a heat exchanger to further heat the hot compressed air stream.

2. The process of claim 1 wherein the hot compressed air stream passing over the solid electrolyte membrane is at a temperature of about 1960° F. and a pressure of about 230 psig.

3. The process of claim 1 wherein from about 23% of the oxygen in the air stream is recovered.

4. The process of claim 1 wherein the partial pressure of oxygen on the feed side is lower than that one the permeate side.

5. The process of claim 4 wherein the air stream is passed over two or more membranes.

6. The process of claim 1 wherein the membrane is made of mixed conductors with mixed conductivity for oxygen ions and electrons.

7. The process of claim 6 wherein the air stream is passed over a doped zirconia membrane.

8. The process of claim 6 wherein the air stream is passed over a doped bismuth oxide membrane.

9. The process of claim 1 which comprises feeding the effluent from the heat exchanger to a steam generating unit to recover additional power.

10. The process of claim 1 which comprises passing a sweep gas over the permeate side of the membrane.

* * * * *